June 6, 1933.   A. LYSHOLM   1,912,586
COOLING FOR ELECTRIC MACHINES
Filed May 29, 1930
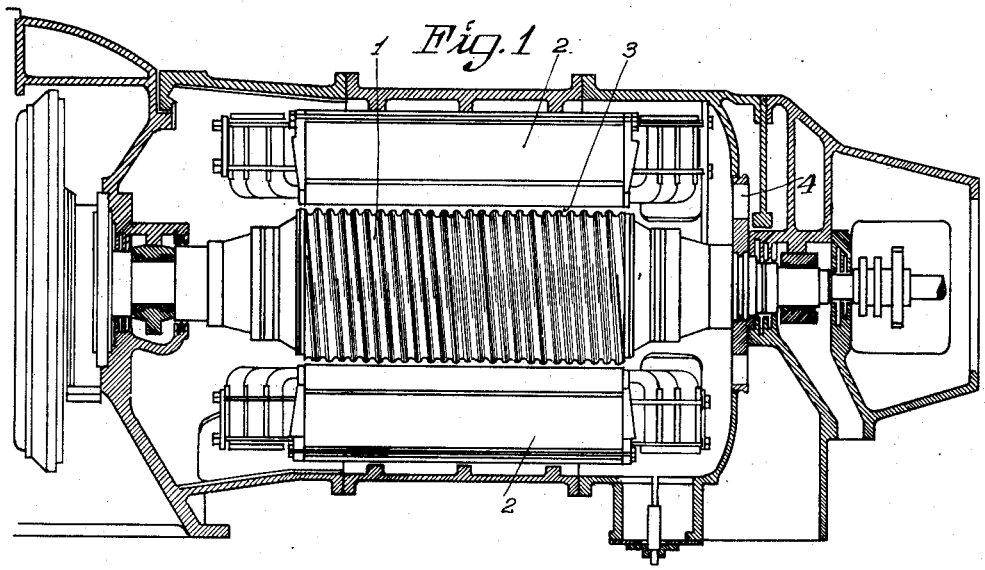
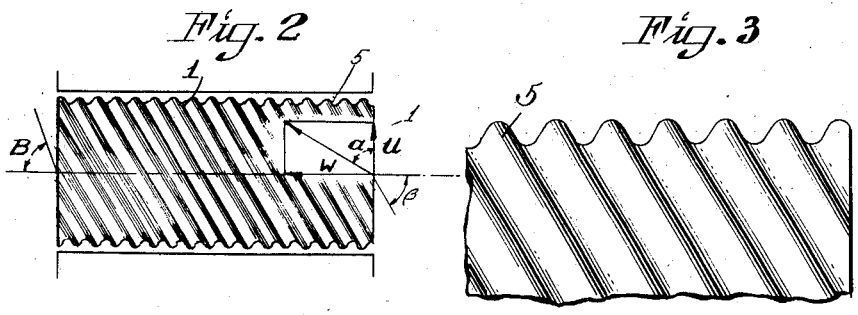
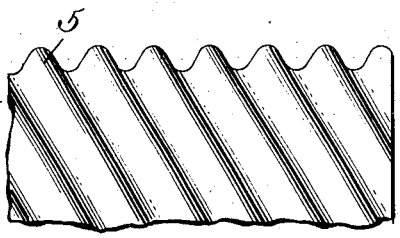
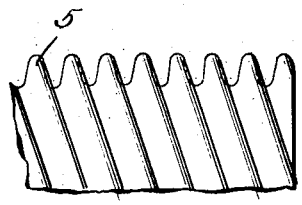
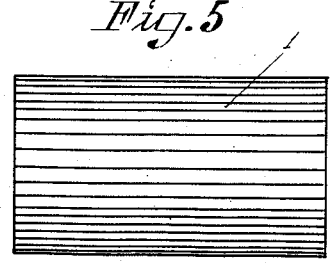
INVENTOR
Alf Lysholm
BY
his ATTORNEY Patented June 6, 1933

1,912,586

UNITED STATES PATENT OFFICE

ALF LYSHOLM, OF STOCKHOLM, SWEDEN, ASSIGNOR TO AKTIEBOLAGET LJUNGSTRÖMS ÅNGTURBIN, OF STOCKHOLM, SWEDEN, A JOINT-STOCK COMPANY OF SWEDEN

COOLING FOR ELECTRIC MACHINES

Application filed May 29, 1930, Serial No. 457,462, and in Germany July 12, 1929.

The present invention relates to cooling and has particular reference to the cooling of rotors of electric machines. Still more particularly the invention relates to cooling of the rotors of turbo-electric generators.

In apparatus of the above character, cooling grooves have heretofore been employed but in most cases such grooves have been formed to extend at right angles to the axis of rotation and have further been formed with rectangular or similar angular cross-sections providing sharp edges. These prior forms of cooling grooves result in the production of such high losses due to friction and eddy currents, particularly when the rotor is operated at high speed, that the advantage obtained by the greater cooling surface provided by the cooling grooves is lost because of the losses directly attributable to the presence of the cooling grooves.

The general object of the present invention is to reduce to a great extent the friction and eddy losses heretofore caused by the presence of cooling grooves and to render the cooling more effective while at the same time retaining the greater cooling area which is obtainable when cooling grooves are employed. Preferably this general object is accomplished by forming the surface of the rotor with corrugations of rounded cross-section so that cooling grooves are obtained which do not have sharp edges and by making the corrugations of helical form with the pitch such that the corrugations and the grooves therebetween are inclined in a direction corresponding approximately to the direction of the resultant of the vectors representing the peripheral velocity of the rotor and the axial velocity of the air. In other words, the pitch is so chosen that air moving axially with a given speed will travel along the surface of the rotor at the same speed as would a nut threaded on the helix and held from rotating. Hence, the air is not required to pass over the corrugations and thus the resistance to flow is greatly reduced. By means of such a formation and arrangement of the cooling grooves the efficiency of the turbo-generators is considerably increased without the temperatures in the rotor increasing. It has been found to be of special advantage to apply the rounded corrugations according to the invention to rotors having grooves arranged in parallel, in which rotors it is not possible to arrange cooling channels of hitherto known construction at the teeth, while the arrangement of grooves according to the invention has proved to be quite possible.

Some embodiments of the invention are shown by way of example in the accompanying drawing.

Fig. 1 shows diagrammatically and in section the contour of a turbo-generator. Fig. 2 shows diagrammatically the grooves on the rotor, having a cross-section of corrugated form and extending helically, this figure also comprising a velocity diagram. Fig. 3 shows a portion of the cooling grooves of the kind as shown in Fig. 2 and on a larger scale. Fig. 4 shows a modification of Fig. 3 in which the cooling grooves, according to the invention, are placed closer to each other and have a greater depth. Fig. 5 shows diagrammatically a rotor having cooling grooves extending parallel to the axis of rotation.

In turbo-generators of the kind shown in Fig. 1, the cooling air drawn in by ventilator 4 is forced into the clearance space 3 between the rotor 1 and the armature 2. The air, after leaving ventilator 4, enters the clearance space 3 in axial direction with a velocity as indicated by the arrow $w$ shown in Fig. 2. In relation to the rotor rotating with the predetermined peripheral velocity, the air entering at right angles to the circumference has a relative peripheral velocity $u$ of the same magnitude but directed in opposite direction, that is to say, the air would, seen from the circumference of the rotor, enter at an angle $\alpha$ formed between the resultant of the two velocities $w$, $u$ and the peripherical velocity. During the passage through the clearance space 3, the magnitude of the actual velocity $w$ is reduced in consequence of the friction and eddy losses, so that the mean inclination of the actually existing relative velocity of the air with respect to the external surface lines of the rotor will correspond to the angle $\beta$. For this reason the channels 5 serving to guide the cooling air must, in case the air is to flow through the same with as little friction as possible, form the angle β with a line on the surface parallel to the axis of the cylindrical rotor.

The cooling grooves have, as clearly shown in Figs. 2–4, a cross-section of rounded corrugated form, in order that the friction and eddy losses of the air may be kept as low as possible, in case the cooling air is not completely guided in the channels. As the air is guided through the channels, that is to say, does not sweep over the same, as has been the case in arrangements hitherto known, the grooves may be made deeper and situated closer to each other (Fig. 4), thereby considerably increasing the cooling area.

Instead of arranging the air channels helically, it is also possible to extend the same in the direction of the axis of rotation, as indicated in Fig. 5, but in this case, the efficient guiding by the channels is lost to a very great extent and also the friction and eddy losses will be increased, so that in this form of embodiment it is extremely important that a cross-section having sharp edges for the channels should be avoided.

The helically arranged channels further may be disposed in such a manner that they at the beginning, immediately beyond the entrance of the cooling air, form a comparatively small angle of inclination β with respect to the external surface lines to the rotor, which angle, however, gradually increases in order to take into consideration the friction and eddy losses of the air, until it has reached its greatest value at the exit of the cooling air from the clearance space 3.

By means of the arrangement of the cooling grooves according to the invention, there is attained a guiding of the cooling air which can pass with greater velocity through the clearance space 3 between the armature and the rotor, thereby obtaining a more efficient cooling of the generator and considerably increasing the efficiency of the generator by decreasing the air friction.

What I claim is:—

1. In an electric machine, a rotor, the surface of said rotor being of corrugated form for promoting cooling thereof, the corrugations having rounded outer portions.

2. In an electric machine, a rotor, the surface of said rotor being of corrugated form for promoting cooling thereof, the corrugations having rounded inner and outer portions.

3. In an electric machine, a rotor, the surface of said rotor being of corrugated form for promoting cooling thereof, the corrugations extending parallel to the axis of rotation of the rotor and being rounded in cross-section.

4. In an electric machine, a rotor, and a casing around said rotor having a cooling air inlet at one end and a cooling air outlet at the other end, the surface of said rotor being of corrugated form for promoting cooling thereof, the corrugations being in the form of a helix of varying pitch, the corrugation adjacent to said inlet forming a smaller angle with a line on the surface of the rotor parallel to the axis than the corrugations adjacent to said outlet.

5. In an electric machine, a rotor and means providing a clearance space around said rotor having an inlet for cooling air adjacent to one end of the rotor and an outlet for cooling air adjacent to the other end of the rotor, the surface of said rotor being of corrugated form and comprising corrugations in the form of a helix, said corrugations being so inclined with respect to the axis of rotation that the direction thereof substantially coincides with the direction of the resultant of the vectors representing the mean axial velocity of the cooling air over the rotor and of the peripheral velocity of the rotor.

6. In an electric machine, a rotor and means providing a clearance space around said rotor having an inlet for cooling air adjacent to one end of the rotor and an outlet for cooling air adjacent to the other end of the rotor, the surface of said rotor being of corrugated form and comprising corrugations in the form of a helix and having rounded outer portions, said corrugations being so inclined with respect to the axis of rotation that the direction thereof substantially coincides with the direction of the resultant of the vectors representing the mean axial velocity of the cooling air over the rotor and of the peripheral velocity of the rotor.

7. In an electric machine, a rotor and means providing a clearance space around said rotor having an inlet for cooling air adjacent to one end of the rotor and an outlet for cooling air adjacent to the other end of the rotor, the surface of said rotor being of corrugated form and comprising corrugations in the form of a helix having a gradually diminishing pitch from said inlet to said outlet.

In witness whereof I hereunto affix my signature.

ALF LYSHOLM.